R. D. MARSHALL.
AXLE LUBRICATING DEVICE.
APPLICATION FILED JULY 16, 1915.
1,169,983.
Patented Feb. 1, 1916.
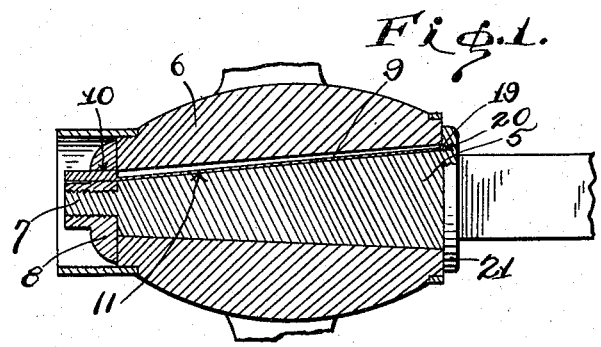
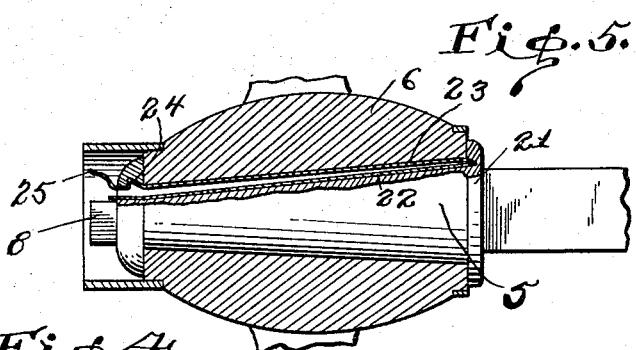
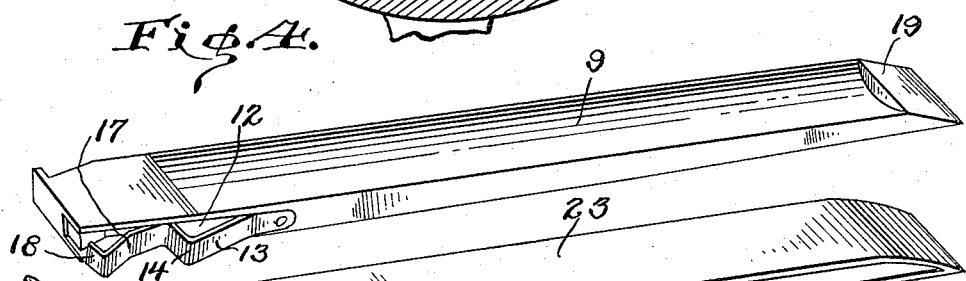
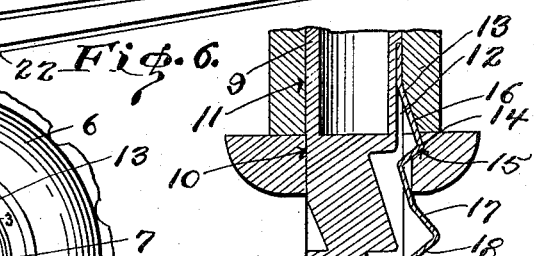
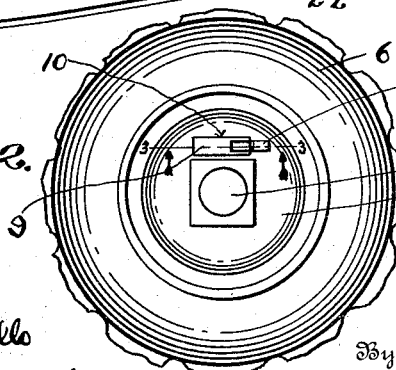
Inventor
R. D. MARSHALL
Witnesses
By
Attorneys

UNITED STATES PATENT OFFICE.

ROBERT D. MARSHALL, OF SEVIERVILLE, TENNESSEE.

AXLE-LUBRICATING DEVICE.

1,169,983.  Specification of Letters Patent.  Patented Feb. 1, 1916.

Application filed July 16, 1915. Serial No. 40,289.

*To all whom it may concern:*

Be it known that I, ROBERT D. MARSHALL, a citizen of the United States, residing at Sevierville, in the county of Sevier, State of Tennessee, have invented certain new and useful Improvements in Axle-Lubricating Devices; and I do hereby declare the following to be a full, clear, and exact description of the invention, such as will enable others skilled in the art to which it appertains to make and use the same.

This invention relates to new and useful improvements in means for lubricating the axle spindles of vehicle wheels and particularly adapted to the provision of such means of that general type including an oil carrying member which is insertible in a longitudinal groove provided in the spindle.

It is the object of the present invention to provide such a lubricating means which may be associated with a spindle in such manner as to supply a maximum amount of grease thereto.

It is further an object to provide such a lubricating means which engages with the usual wheel securing nut to prevent its accidental displacement whereby the device serves as a lock nut in addition to its lubricating function.

It is further an object to provide such a device which may be formed of a single length of resilient material and which engages with the retaining nut of the spindle in such manner as to prevent displacement of the nut and to prevent its own displacement.

With the above and other objects and advantages in view, the invention resides more particularly in the novel combination, formation and arrangement of parts as more fully described hereinafter and pointed out in the appended claims.

Reference is had to the accompanying drawings, wherein similar characters of reference designate corresponding parts throughout the several views, and in which:

Figure 1 is a vertical sectional view taken through an axle spindle and showing the improved invention applied thereto. Fig. 2 is an end view of the structure shown in Fig. 1. Fig. 3 is a sectional view taken transversely on the line 3—3 of Fig. 2. Fig. 4 is a perspective view of the plunger bar of the device. Fig. 5 is a sectional view similar to Fig. 1, showing a modified form of the invention. Fig. 6 is a perspective view of the plunger bar of this modified form.

Referring now more particularly to the accompanying drawings, 5 designates an axle spindle of conventional type on which is positioned the hub 6 and the spindle is provided at its free end with the usual reduced threaded extension 7 on which is engaged the flange nut 8 which holds the wheel against displacement.

The improved lubricating means whereby the spindle may be greased without necessitating the removal of the wheel therefrom comprises a plunger bar 9 which is adapted to be passed through an opening 10 in the flange of the nut and to lie in a longitudinal groove 11 formed in the periphery of the spindle. This groove is decreasingly tapered in depth toward its rear end and the bar is correspondingly tapered so that an amount of grease may be placed on the outer end of the bar and the bar then inserted in the groove to position the grease along the bore of the wheel hub. The outer face of the lubricator bar is longitudinally concaved to facilitate the application of a maximum amount of grease, but said outer face may be, if desired, formed in any other manner to accomplish this function and facilitate proper distribution of the grease.

When the bar is inserted in the groove, its outer end extends outwardly of the flange of the nut 8 so that it may be conveniently gripped, and to lock this bar in position one edge thereof is provided with a groove 12 in the inner end of which is secured a leaf spring 13 which is normally urged outwardly and is intermediately bent to provide a shoulder 14 which is engageable in a shoulder 15 formed in the flange of the nut by providing said flange and the adjacent portion of the groove 11 with an inclined groove 16. The outer end of this spring is bent outwardly and then inwardly at 17 to lie over the end of the bar to form a finger grip 18 whereby it may be readily manipulated.

To hold the inner end of the plunger bar within the peripheral surface of the spindle, its inner end is beveled at 19 and adapted to be engaged in a socket 20 formed by extending the inner end of the groove into the usual flange 21 formed at the juncture of the spindle and the main axle portion.

In the structure described it is seen that a dual function is provided in that not only is an efficient means for lubricating provided but a means is also provided whereby the nut 8 is held against loosening and displacement.

Figs. 4 and 5 illustrate a modification of the device wherein the plunger bar is formed of a single strip of spring material bent intermediately upon itself to form the inner and outer arms 22 and 23, respectively, and the free end portion of the arm 23 is bent upwardly to provide a shoulder 24 and extended to form a finger piece 25. In using this form, the arms are squeezed together and grease or other lubricant spread along the entire face of the arm 23. The bar member is then inserted through the opening 10 of the nut flange into the groove and when it has reached its final position the arm 23 is released and in springing outwardly it forces the grease along the bore of the wheel hub. The shoulder 24 is engageable with the wheel flange and serves to hold the device against retraction in the manner of the spring 17 shown in the form of the device first described.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. The combination with a spindle provided with a longitudinal groove, and a nut threaded on the spindle, formed with an opening to aline with said groove, of a lubricator member removably inserted through said opening to lie within the groove, said member including resilient arms normally divergent and means on one of said arms for locking engagement with the nut.

2. The combination with a spindle formed of a longitudinally extending groove and having a nut threaded on its end and provided with an opening adapted to aline with the groove, of a plunger member insertible through the opening to lie in the groove and comprising a resilient strip intermediately bent upon itself to form arms resiliently urged apart, and one of said arms being provided with a shoulder adapted to engage against the nut to prevent accidental retraction.

In testimony whereof, I affix my signature, in the presence of two witnesses.

ROBERT D. MARSHALL.

Witnesses:
J. S. BALLARD,
F. M. WYNN.

Copies of this patent may be obtained for five cents each, by addressing the "Commissioner of Patents Washington, D. C."